United States Patent [19]

Albers

[11] 4,037,566

[45] July 26, 1977

[54] CATTLE LOCKING APPARATUS

[76] Inventor: Teunis Albers, 21205 Norwalk Blvd., Artesia, Calif. 90701

[21] Appl. No.: 689,586

[22] Filed: May 24, 1976

[51] Int. Cl.² ............................................. A01K 1/06
[52] U.S. Cl. .................................... 119/147; 119/148
[58] Field of Search ................. 119/147, 148, 149, 27, 119/98, 99, 150

[56] References Cited

U.S. PATENT DOCUMENTS 1,002,275  9/1911  James .................................... 119/147

FOREIGN PATENT DOCUMENTS 2,242,929  4/1975  France ................................. 119/148

Primary Examiner—J.N. Eskovitz
Attorney, Agent, or Firm—Fulwider, Patton, Rieber, Lee & Utecht

[57] ABSTRACT

Cattle locking apparatus in which a plurality of fixed and release stanchions are located adjacent one another to define a row of head openings for the animals. Each release stanchion is pivotally supported, and is also pivotally connected at its upper extremity to a horizontally reciprocable release rod for simultaneous movement of all of the release stanchions between open positions, in which the cattle can place their heads in the head openings, and closed positions in which the cattle are locked in the apparatus. Decouplers are operative upon movement of the release stanchions to their open positions to permit the release rod to be moved back to its previous position independently of the now open release stanchions. The release stanchions each include an actuator located below the release stanchion upper portion, and also located in the head opening in the open position of the release stanchion. In this position the actuator is engageable by the neck of an animal with its head in the head opening and the release stanchion is pivotable to its closed position by the animal as it dips its head in the opening to feed. In their closed positions the release stanchions re-engage the master rod and thereby automatically lock the cattle in place. Means are provided to disable the self-locking mechanisms, when desired, so that the cattle cannot lock themselves in the apparatus until the release rod is moved by an operator.

11 Claims, 10 Drawing Figures

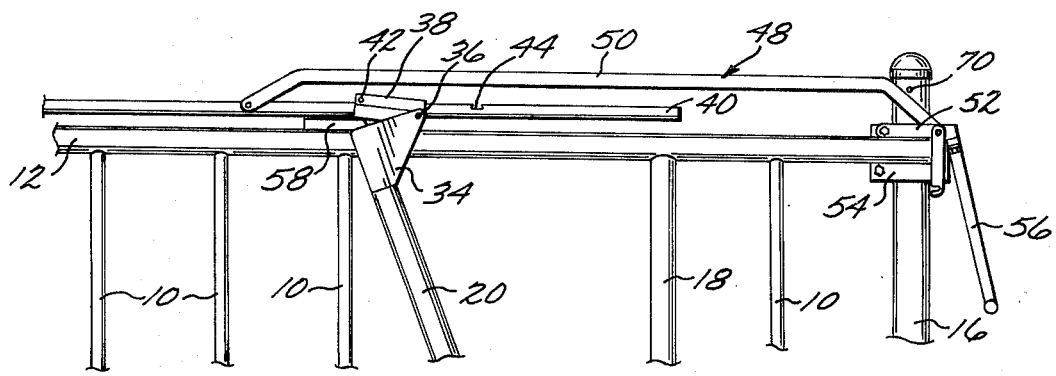
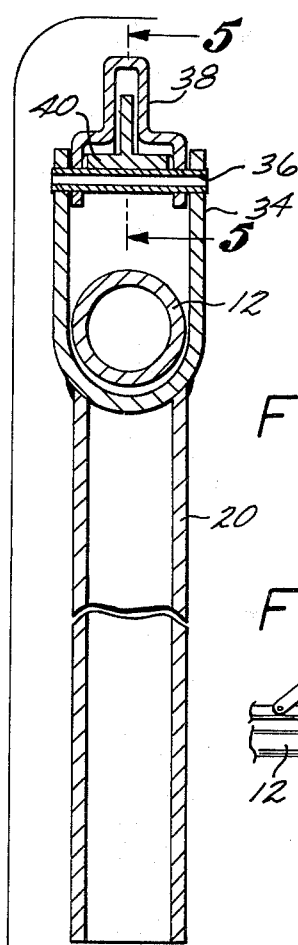
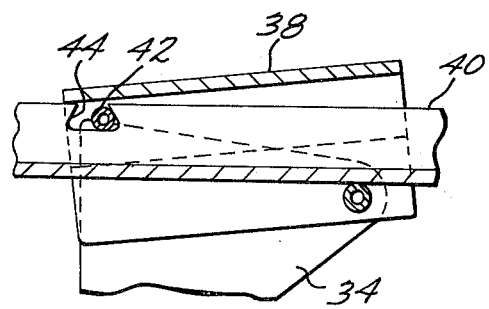
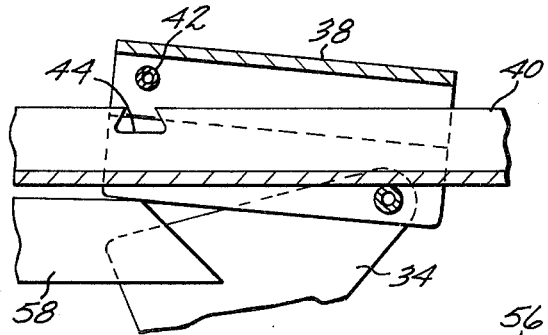
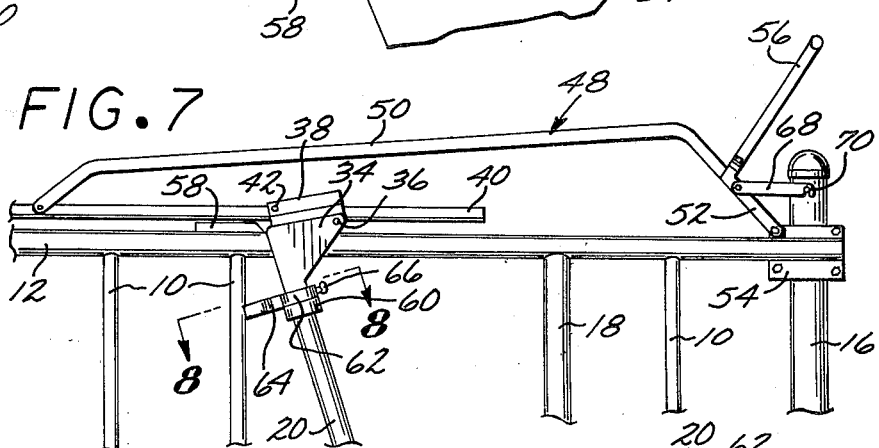
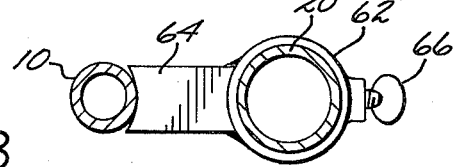

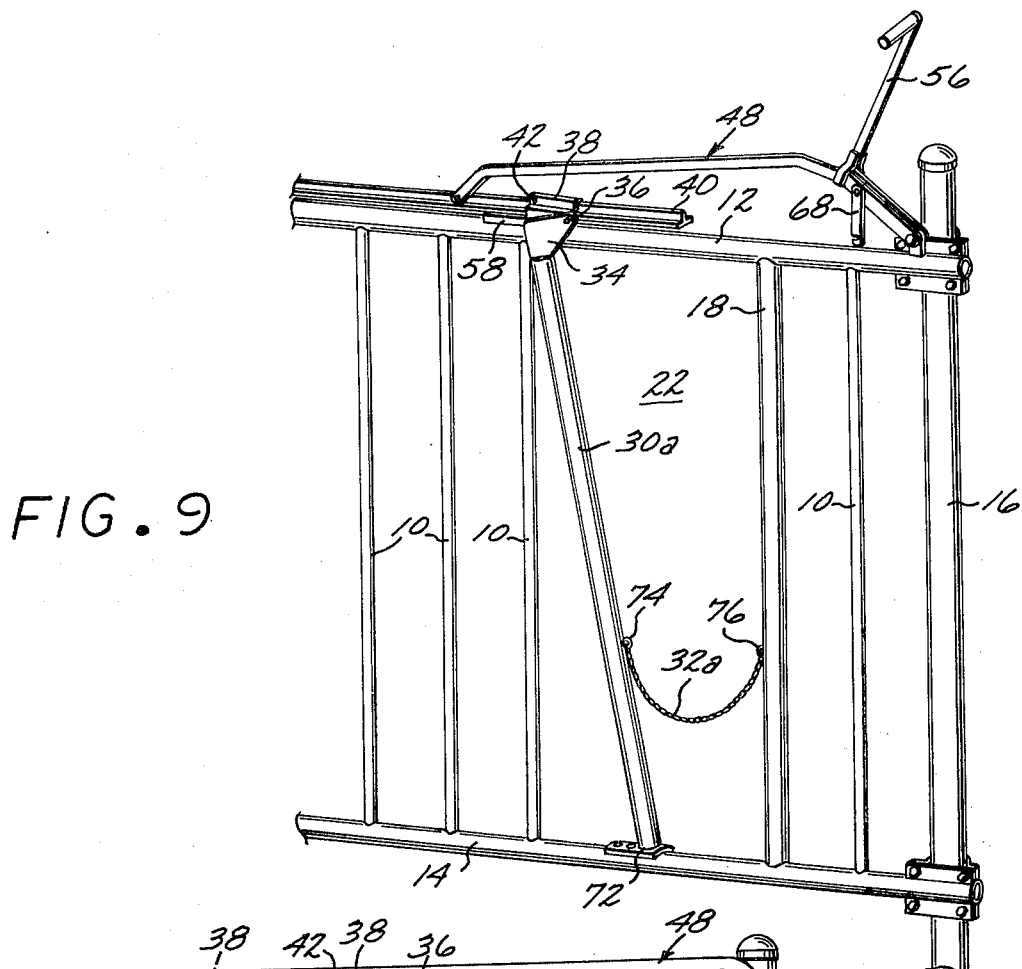

CATTLE LOCKING APPARATUS

CROSS REFERENCE TO RELATED APPLICATION

The present apparatus is related to that disclosed in applicant's U.S. Pat. application Ser. No. 613,169, filed Sept. 15, 1975, and entitled "Locking Stanchion for Cattle". The present apparatus differs from that of the application in a number of respects, but principally in that it provides a capability for automatically locking individual animals in feeding position without the intervention of an operator.

BACKGROUND OF THE INVENTION

1. Field of the Invention:

The present invention relates to a cattle locking apparatus and more particularly to cattle locking apparatus capable of actuation by the cattle without the intervention of an operator.

2. Description of the Prior Art:

Various types of cattle locking apparatus are disclosed in the prior art, but insofar as is known such apparatus does not enable the individual animal to itself initiate the locking action.

SUMMARY OF THE INVENTION

The present invention provides a cattle locking apparatus in which a fixed stanchion and a release stanchion define a head opening for an animal, with the release stanchion being pivotally mounted for movement to an open position in which an associated actuator is presented for engagement by the neck of an animal with its head in the head opening. In the open position of the release stanchion the upper portion thereof is pivoted away from the fixed stanchion to enlarge the upper part of the head opening. This enables an animal to place its head in the upper part of the opening and engage the actuator on dipping its head to feed, as above mentioned, to thereby pivot the release stanchion to a closed position in which its upper portion moves toward the fixed stanchion and narrows the upper part of the head opening to retain the animal in position.

Each release stanchion includes a coupling element detachably received in a release means which is reciprocably movable to pivot the release stanchions. The apparatus includes decoupling means engageable with each coupling element, respectively, to detach the coupling elements from the release means when the release stanchions are moved to their open positions. This permits the release means to be moved back independently of the release stanchions, thereby leaving each release stanchion in position to be pivoted by an animal to a closed position. Upon such pivotal movement the coupling element of the release stanchion re-engages the release means and is held in its closed position.

If desired, the apparatus can be provided with means for preventing the coupling elements from becoming disengaged from the release means when all of the release stanchions are moved to their open positions. This prevents pivotal movement of a released stanchion to its closed position independently of the release means. Consequently, the cattle cannot independently lock the apparatus without the intervention of an operator.

Other objects and features of the invention will become apparent from consideration of the following description taken in connection with the accompanying drawings.

BRIEF DESCRIPTION OF THE DRAWINGS

FIG. 3 is a partial front elevational view similar to that of FIG. 2, but illustrating the release rod moved to its locking position independently of the release stanchion, which is in its open position.

FIG. 4 is an enlarged view taken along line 4—4 of FIG. 1;

FIG. 5 is a view taken along the line 5—5 of FIG. 4, illustrating the coupling element of the release stanchion in engaged relation with the release rod;

FIG. 6 is a view similar to FIG. 5, but illustrating the coupling element detached from the release rod by the decoupler;

FIG. 7 is a view similar to FIG. 2, but illustrating two different means for preventing the release stanchion from pivoting all the way to its open position, such means halting such pivotal movement just short of the point where the coupling element is detached from the release rod by the decoupler;

FIG. 8 is an enlarged view taken along the line 8—8 of FIG. 7;

FIG. 9 is a perspective view of a second embodiment of the present cattle locking mechanism, illustrating the components in a state corresponding to that illustrated in FIG. 2 for the first embodiment; and FIG. 10 is a front elevational view of the apparatus of FIG. 9, but illustrating the components in a state corresponding to that illustrated in FIG. 1 for the first embodiment.

DESCRIPTION OF THE PREFERRED EMBODIMENTS

Figure 1:
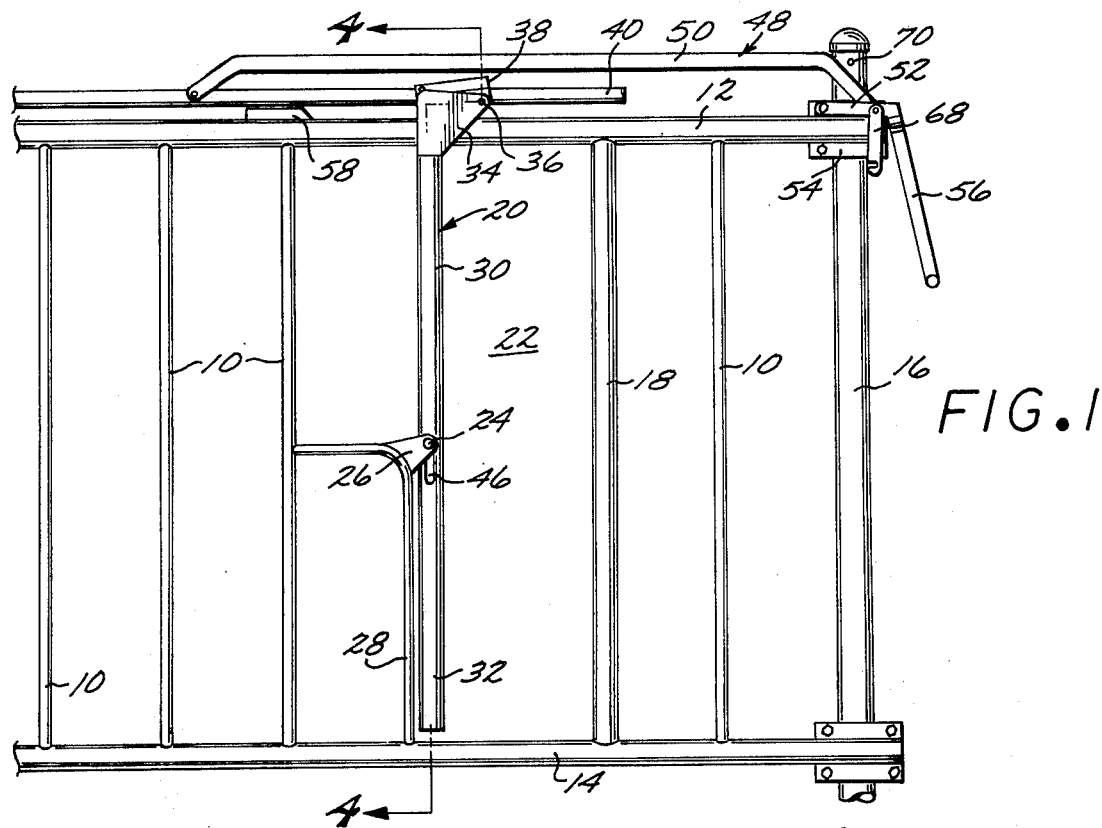
FIG. 1 is a front elevational view of one end of a cattle locking apparatus according to the present invention, and illustrating the release rod in its locking position and the release stanchion in its closed position.

Referring now to the drawings, there is illustrated a stanchion structure of the type in which a plurality of upright, horizontally spaced apart bars or rods 10 extending between and are welded to a tubular top rail 12 and a tubular bottom rail 14. The stanchion structure is supported by a plurality of tubular vertical rails 16, only one of which is illustrated, which is secured to the ground or other supporting structure at its lower end.

At horizontally spaced intervals the rods 10 are replaced by larger tubular fixed stanchions 18, only one of which is illustrated, which is welded or otherwise rigidly secured at its upper and lower extremities to the top and bottom rails 12 and 14. An elongated release stanchion 20 is located adjacent each fixed stanchion 18 to define a head opening 22 for an animal.

Although only one fixed stanchion 18 and release stanchion 20 are illustrated, it will be understood that this arrangement is repeated at regular intervals along the length of the present apparatus to define as many head openings 22 as may be desired.

Figure 2:
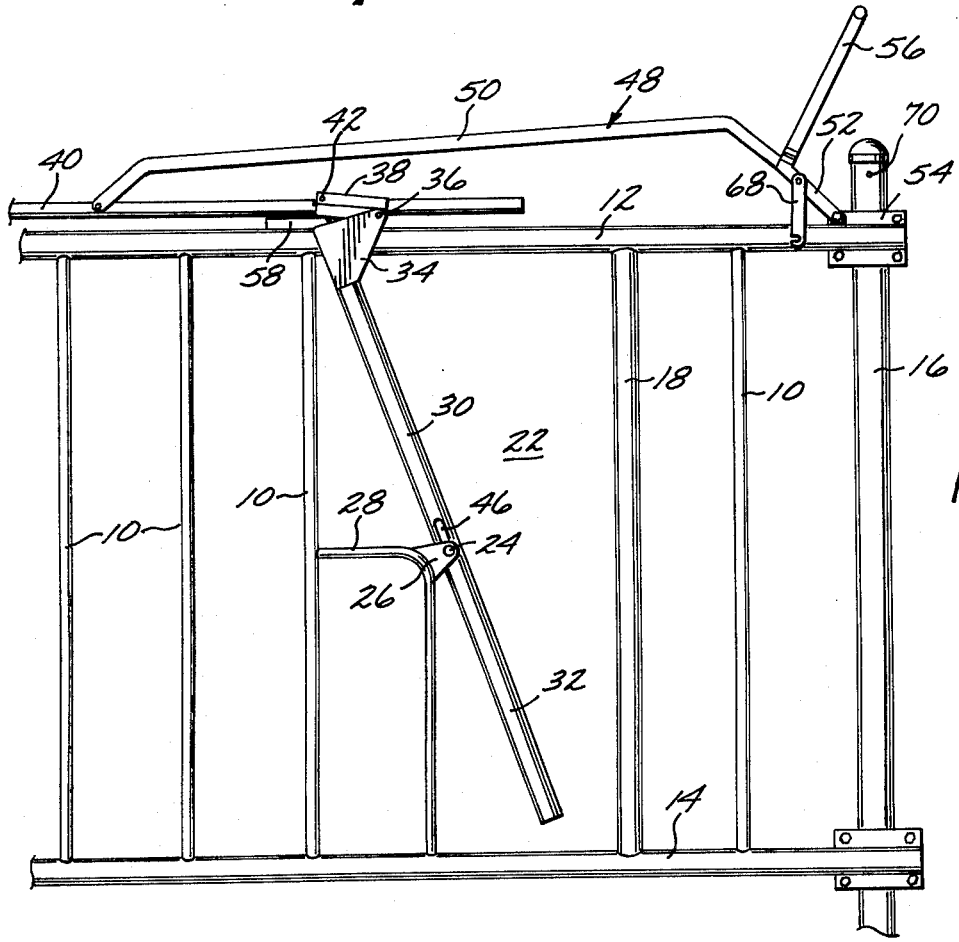
FIG. 2 is a view similar to FIG. 1, but illustrating the release rod in its release position and the release stanchion in its open position.

Each release stanchion 20 is mounted for pivotal movement between its closed position, as illustrated in FIG. 1, and its open position, as illustrated in FIG. 2, the pivotal movement in the embodiment illustrated in FIGS. 1 and 2 being about an axis located between its opposite extremities and defined by a pivot bolt 24 extending through a bracket 26 which is welded to a right angular section of tubing 28 welded at one end to the adjacent rod 10 and at the other, lower end to the bottom rail 14.

The release stanchion 20 is preferably pivotally mounted at a point below its midpoint so that the greater part of its weight is located above the pivot bolt 24. As will be seen, this arrangement tends to cause the release stanchion 20 to remain in its open position in the absence of any positive movement urging it to pivot to its closed position.

In its open position, as illustrated in FIG. 2, the longer upper portion 30 of the release stanchion 20 is pivoted away from the fixed stanchion to enlarge the upper part of the head opening 22, thereby enabling an animal to place its head through the head opening. The release stanchion 20 includes an actuator or actuating means which in the present embodiment is constituted by the lower portion 32 of the release stanchion 20. It simultaneously occupies a position in which it is pivoted toward the fixed stanchion 18 to project into the lower part of the head opening 22. In contrast, in the closed position of the release stanchion 20, as illustrated in FIG. 1, the upper portion 30 is pivoted toward the fixed stanchion 18 to narrow the upper part of the head opening 22, with the lower portion 32 being simultaneously pivoted away from the fixed stanchion 18 to enable an animal with its head through the head opening 22 to move its neck downwardly from the upper part to the lower part of the head opening 22, as will be seen.

The upper end of each release stanchion 20 is secured to a U-shaped bracket 34 whose opposite legs extend on opposite sides of the top rail 12, as best viewed in FIG. 4. There is sufficient clearance between the top rail 12 and the interior walls of the bracket 34 that the bracket 34 is longitudinally slidable relative to the rail 12.

The upper portions of the legs of the bracket 34 mount the opposite ends of a pivot pin 36 which extends across the top of the top rail 12 and through the opposite sides of a coupling element 38. The element 38 straddles an elongated release rod 40 of inverted T-shape and is pivotable upon the bracket 34.

The release rod 40, which extends horizontally and substantially parallel to the top rail 12 in overlying relation to the pin 36, is movable to the left to a release position, as illustrated in FIG. 2, and to the right to a locking position, as illustrated in FIG. 1.

The upper portion of each coupling element 38 includes an interior cavity of generally inverted T-shaped cross-section to complementally conform to the cross-section of the release rod 40. With this complementary configuration, the coupling element 38 and release rod 40 are slidable relative to one another. As will be seen, the present apparatus provides for releasable connection of the release stanchion 20 to the release rod 40 for common movement therewith by means of a pin 42, as best seen in FIGS. 5 and 6, which is received within an upwardly open slot 46 provided in the upper right portion of the coupling element 38, as viewed in FIG. 2. With the pin 42 in the slot 44, any movement of the release rod 40 between its release position and its locking position is accompanied by corresponding movement of the release stanchion 20 from its open position to its closed position. However, the coupling element 38 may be lifted manually to remove the pin 42 from the slot 44, and thereby enable movement of the release stanchion 20 independently of the release rod 40. This permits the operator to open one stall or head opening 22 without opening the other stalls. Disengagement of the pin 42 from the slot 44 can also be effected by a decoupler, as will be described later.

The path of travel of the upper extremity of the release stanchion 30 is not a true arc because of the provision of an elongated slot 46 for receiving the pivot bolt 24. The slot 46 enables the stanchion 30 to move up and down during pivotal movement so that its upper extremity can travel essentially parallel with the top rail 12.

Various forms of coupling element 38 may be used in conjunction with the present apparatus. Other exemplary forms are disclosed in my copending Pat. application Ser. No. 613,169. Consequently, the present invention is not intended to be limited to the particular coupling element 38 which is disclosed.

As best seen in FIGS. 1 through 3, movement of the release rod 40 is effected by actuation of a locking handle assembly 48 connected to one end of the rod 40. The assembly 48 includes an elongated bar 50 pivotally connected at one end to the rod 40 and at the other end to one end of a link 52. The opposite end of the link 52 is pivotally connected to a bracket 54 which is fixedly secured to the upper extremity of the vertical rail 16. A manually operable handle 56 is fixedly connected to the link 52 and is movable between the positions illustrated in FIGS. 1 and 2 to move the release rod 40 between its release and locking positions.

A decoupler 58 for effecting automatic disengagement between the rod 40 and the element 38 is welded or otherwise secured to the top rail 12. It is characterized by an inclined edge or ramp engageable with the legs of the coupling element 38, as best seen in FIG. 2, to raise the element 38 sufficiently to move the pin 42 out of the slot 44, from the position illustrated in FIG. 5 to that illustrated in FIG. 6, thereby decoupling the element 38 from the rod 40. This permits the rod 40 to be moved to the right to its locking position independently of the release stanchion 20, as best illustrated in FIG. 3. In this locking position the detent or slot 44 is located to the right of the pin 42, in position to reengage the pin 42 when the release stanchion 20 is pivoted back to its closed position. Such pivotal movement of the stanchion 20 can be initiated by an animal moving its head downwardly in the opening 22 and against the stanchion 20. For this purpose an operator first actuates the locking assembly handle 48 to move all of the release stanchions 20 to their open positions, as illustrated in FIG. 2. The coupling elements 38 are automatically detached from the release rod 40 by interengagement between the elements 38 and the decouplers 58. The locking handle assembly 48 is now operated to move the release rod 40 to the right, independently of the release stanchions 20, into the locking position illustrated in FIG. 3. Any animal now placing its head in the opening 22, and dipping its head to feed, will effect pivotal movement of the release stanchion 30 into its locking position. In this position the pin 42 of the coupling element 38 is again received within the slot 44. In this manner individual animals can lock themselves in the feeding stalls without the intervention of an operator.

There are occasions when it is desirable to disable the self-locking mechanisms of the apparatus so that cattle cannot lock themselves in until an operator moves the locking handle 56 into the position of FIG. 1. In such instances, the operator can employ one of two means, as best illustrated in FIGS. 7 and 8.

More particularly, the release stanchion 20 is provided with a collar 60 which is fixed in position to a sleeve 62 for rotation about the stanchion 20. The sleeve 62 includes a lateral element or stop 64 having a stop position in which it is adapted to engage the adjacent fixed element or rod 10, as illustrated in FIG. 7.

The sleeve 62 is rotatable about the stanchion 20 to a clearing position in which the stop 64 is located out of possible engagement with the rod 10. A thumb screw 66 mounted to the sleeve 62 is rotatable to secure the stop 64 in either its stop or its clearing position.

In operation, if the operator wishes to prevent the coupling element 38 from being automatically disengaged from the release rod 40 by the decoupler 58, he rotates the stop 64 into the stop position of FIG. 7 and tightens the screw 62. The stop 64 then engages the rod 10 and prevents the release stanchion 20 from moving farther to the left to its open position. This prevents the coupling element 38 from engaging the decoupler 58 so that the pin 42 remains in position within the slot 44 of the release rod 40. This makes it impossible for an animal to lock itself into the cattle opening 22 because the stanchion 20 cannot be pivoted by the animal.

The same result can be achieved by utilizing an elongated restraining means or line 68 pivotally secured at one end to the handle link 52, and at the other end to a pin 70 secured to the fixed vertical rail 16.

When the link 68 is in the position of FIG. 7, a recess thereof receives the pin 70. This prevents farther movement to the left of the handle bar 50, thereby preventing movement of the release rod 40 farther to the left. As previously indicated, this prevents the coupling element 38 from becoming disengaged from the release rod 40 by the decoupler 58.

Referring now to FIGS. 9 and 10, there is illustrated a second embodiment of the present cattle locking apparatus. This embodiment is identical to the first embodiment in construction and operation except for the character of the release stanchion and its associated actuating means. In particular, the operation and interaction of the pivot pin 36, coupling element 38, release rod 40, locking handle assembly 48, and stop 64 are the same in both embodiments. Identical elements are assigned like numbers, while non-indentical elements having functions similar to that of the first embodiment are assigned like numbers with the letter "a".

The release stanchion 30a is pivoted for movement about an axis passin through its base 72. The construction of the base 72 and the associated bottom rail 14 to permit such pivotal movement is more particularly described in my copending patent application Ser. No. 613,169.

Release stanchion 30a includes an actuator comprising a flexible element or chain 32a attached at its opposite ends to screw eyes 74 and 76 which are screwed into the release stanchion 30a and the adjacent fixed stanchion 18. This locates the chain 32a in the head opening 22 for engagement by the neck of an animal having its head in the upper part of the opening 22. The position of the animal's neck is represented in phantom outline at 78 in FIG. 10, with the release stanchion 30a in its open position also being illustrated in phantom outline.

When the animal dips its head to feed from a receptable (not shown) below the bottom rail 14 its neck engages the chain 32a and moves it from the phantom position to the full line position illustrated in FIG. 10. This movement of the chain 32a pivots the release stanchion 30a in a clockwise direction to the full line, closed position illustrated in FIG. 10. In this position the release stanchion 30a becomes releasably coupled to the release rod 40, as previously described in connection with the first embodiment, so that it cannot be moved by the animal, thereby locking the animal in feeding position.

From the foregoing it will be apparent that a cattle locking apparatus has been provided which is adapted to lock cattle in feeding position, either by operator actuation or by animal actuation without the intervention of the operator.

Various modifications and changes may be made with regard to the foregoing detailed description without departing from the spirit of the invention.

I claim:

1. Cattle locking apparatus comprising:

a fixed stanchion;

a release stanchion located adjacent said fixed stanchion to define a head opening for an animal, said release stanchion having an upper portion and further having actuating means located below said upper portion, said upper portion including a coupling element;

mounting means mounting said release stanchion for pivotal movement between open and closed positions, said upper portion in said open position being pivoted away from said fixed stanchion to enlarge the upper part of said head opening and thereby enable an animal to place its head through said head opening, said actuating means in said open position being located in said head opening for engagement by the neck of an animal with its head in said upper part of said head opening, said upper portion in said closed position being pivoted toward said fixed stanchion to narrow the upper part of said head opening, said actuating means being operative to pivot said release stanchion to said closed position upon movement of the animal's neck against said actuating means and into the lower part of said head opening;

release means for detachably receiving said coupling element, said release means being movable into a release position to pivot said release stanchion into said open position, and movable into a locking position to pivot said release stanchion into said closed position; and decoupling means engageable with said coupling element in said open position of said release stanchion to detach said coupling element from said release means whereby said release means is movable into said locking position independently of said release stanchion to leave said release stanchion in said open position, said release means being operative to detachably receive said coupling element of said release stanchion when said release means is in said locking position and said release stanchion is in said closed position.

2. Cattle locking apparatus according to claim 1 wherein said actuating means comprises an elongated flexible member attached at its opposite extremities to said fixed stanchion and said release stanchion and, extending across said head opening.

3. Cattle locking apparatus according to claim 2 wherein said release stanchion is pivotable between said open and closed positions about an axis located at the base of said release stanchion.

4. Cattle locking apparatus according to claim 1 wherein said actuating means comprises a lower portion extending downwardly of said upper portion.

5. Cattle locking apparatus according to claim 4 wherein said release stanchion is pivotable between said open and closed positions about an axis located between the opposite extremities of said release stanchion.

6. Cattle locking apparatus comprising:
a fixed stanchion;
a release stanchion located adjacent said fixed stanchion to define a head opening for an animal, said release stanchion having an upper portion and a lower portion, said upper portion including a coupling element;
mounting means mounting said release stanchion for pivotal movement between open and closed positions and about an axis located between its opposite extremities, said upper portion in said open position being pivoted away from said fixed stanchion to enlarge the upper part of said head opening and thereby enable an animal to place its head through said head opening, said lower portion in said open position being pivoted toward said fixed stanchion to project into the lower part of said head opening, said upper portion in said closed position being pivoted toward said fixed stanchion to narrow the upper part of said head opening, and said lower portion in said closed position being pivoted away from said fixed stanchion to enable an animal with its head through said head opening to move its neck downwardly from the upper part to the lower part of said head opening;
release means for detachably receiving said coupling element, said release means being movable into a release position to pivot said release stanchion into said open position, and movable into a locking position to pivot said release stanchion into said closed position; and
decoupling means engageable with said coupling element in said open position of said release stanchion to detach said coupling element from said release means whereby said release means is movable into said locking position independently of said release stanchion to leave said release stanchion in said open position, said release stanchion being pivotable toward said closed position on downward movement of an animal's neck against said lower portion whereby the animal's head is held between said fixed stanchion and said release stanchion, said release means being operative to detachably receive said coupling element of said release stanchion when said release means is in said locking position and said release stanchion is in said closed position.

7. Cattle locking apparatus according to claim 6 wherein said fixed stanchion and said release stanchion are disposed generally upright and parallel in said open position of said release stanchion.

8. Cattle locking apparatus according to claim 6 wherein said axis is located below the middle of said release stanchion whereby said upper portion is heavier than said lower portion and thereby tends to remain in said open position when said coupling element is detached from said release means by said decoupling means.

9. Cattle locking apparatus according to claim 6 wherein said release means includes a detent detachably receiving said coupling element, and said decoupling means is a stop engageable by said coupling element and operative to lift said coupling element out of said detent.

10. Cattle locking apparatus according to claim 6 and including a first fixed element and a stop means on said release stanchion selectively positionable between a clearing position, out of possible engagement with said first fixed element, and a stop position wherein said stop means is engaged upon said first fixed element on movement of said release stanchion toward said open position to prevent said decoupling means from detaching said coupling element from said release means whereby said release stanchion is incapable of moving independently of said release means.

11. Cattle locking apparatus according to claim 6 and including a second fixed element and a restraining means on said release means selectively engageable with said second fixed element to stop said release means from moving all the way into said release position, thereby preventing said decoupling means from detaching said coupling element from said release means whereby said release stanchion is incapable of moving independently of said release means.

* * * * *